(12) United States Patent
Anzai (10) Patent No.: US 8,403,559 B2
(45) Date of Patent: Mar. 26, 2013

(54) TWO-TERMINAL SEMICONDUCTOR SENSOR DEVICE

(75) Inventor: Ryoichi Anzai, Chiba (JP)

(73) Assignee: Seiko Instruments Inc., Chiba (JP)

( * ) Notice: Subject to any disclaimer, the term of this patent is extended or adjusted under 35 U.S.C. 154(b) by 790 days.

(21) Appl. No.: 12/546,340

(22) Filed: Aug. 24, 2009

(65) Prior Publication Data

US 2010/0054302 A1 Mar. 4, 2010

(30) Foreign Application Priority Data

Aug. 29, 2008 (JP) .................................. 2008-222098
Feb. 23, 2009 (JP) .................................. 2009-039343

(51) Int. Cl.
*G01K 7/01* (2006.01)

(52) U.S. Cl. ........................................ 374/178; 327/513

(58) Field of Classification Search .................. 374/170, 374/178; 327/512, 513, 404, 411, 419, 478; 702/130–136

See application file for complete search history.

(56) References Cited

U.S. PATENT DOCUMENTS

| | | | |
|---|---|---|---|
| 4,123,698 A | 10/1978 | Timko et al. | |
| 5,918,982 A * | 7/1999 | Nagata et al. | 374/178 |
| 6,037,832 A * | 3/2000 | Kaminishi | 327/538 |
| 6,255,892 B1 * | 7/2001 | Gartner et al. | 327/512 |
| 6,733,174 B2 * | 5/2004 | Matsumoto et al. | 374/178 |
| 6,948,847 B2 * | 9/2005 | Pihet et al. | 374/178 |
| 7,145,380 B2 * | 12/2006 | Hsu | 327/512 |
| 7,214,910 B2 * | 5/2007 | Chen et al. | 219/494 |
| 7,350,974 B2 * | 4/2008 | Mikuni et al. | 374/178 |
| 7,410,293 B1 * | 8/2008 | Santurkar et al. | 374/178 |
| 7,750,726 B2 * | 7/2010 | Fujisawa et al. | 327/538 |
| 7,789,558 B2 * | 9/2010 | Yoshida et al. | 374/178 |
| 7,821,320 B2 * | 10/2010 | Ueda | 327/512 |
| 7,988,354 B2 * | 8/2011 | Jansen | 374/170 |
| 8,140,293 B2 * | 3/2012 | Jeong et al. | 702/130 |
| 8,177,420 B2 * | 5/2012 | Pan | 374/1 |
| 8,210,743 B2 * | 7/2012 | Hasegawa | 374/178 |
| 2009/0256623 A1 * | 10/2009 | Tajima | 327/512 |

* cited by examiner

*Primary Examiner* — Gail Verbitsky (74) *Attorney, Agent, or Firm* — Brinks Hofer Gilson & Lione (57) ABSTRACT

Provided is a two-terminal semiconductor sensor device with which an external device having low circuit or element accuracy may be used. An output voltage (VOUT) of the two-terminal semiconductor sensor device based on temperature is not based on a constant current of a constant current source (70) of the external device and a current of an output transistor (60) of the two-terminal semiconductor sensor device, but on a resistance ratio of a voltage dividing circuit including a resistor (30) and a resistor (40), and a temperature voltage (Vbe) of the two-terminal semiconductor sensor device. Accordingly, accuracy of the constant current of the constant current source (70) of the external device that receives the output voltage (VOUT) does not need to be high. Therefore, the external device does not need to have a highly accurate circuit or element for receiving the output voltage (VOUT).

4 Claims, 5 Drawing Sheets

TWO-TERMINAL SEMICONDUCTOR SENSOR DEVICE

RELATED APPLICATIONS

This application claims priority under 35 U.S.C. §119 to Japanese Patent Application Nos. JP2009-039343 filed on Feb. 23, 2009 and JP2008-222098 filed on Aug. 29, 2008, the entire contents of which are hereby incorporated by reference.

BACKGROUND OF THE INVENTION

1. Field of the Invention

The present invention relates to a semiconductor sensor device for measuring a physical amount such as temperature or pressure, and more particularly, to a two-terminal semiconductor sensor device to be connected to an external device through only two external terminals.

2. Description of the Related Art

Figure 6:
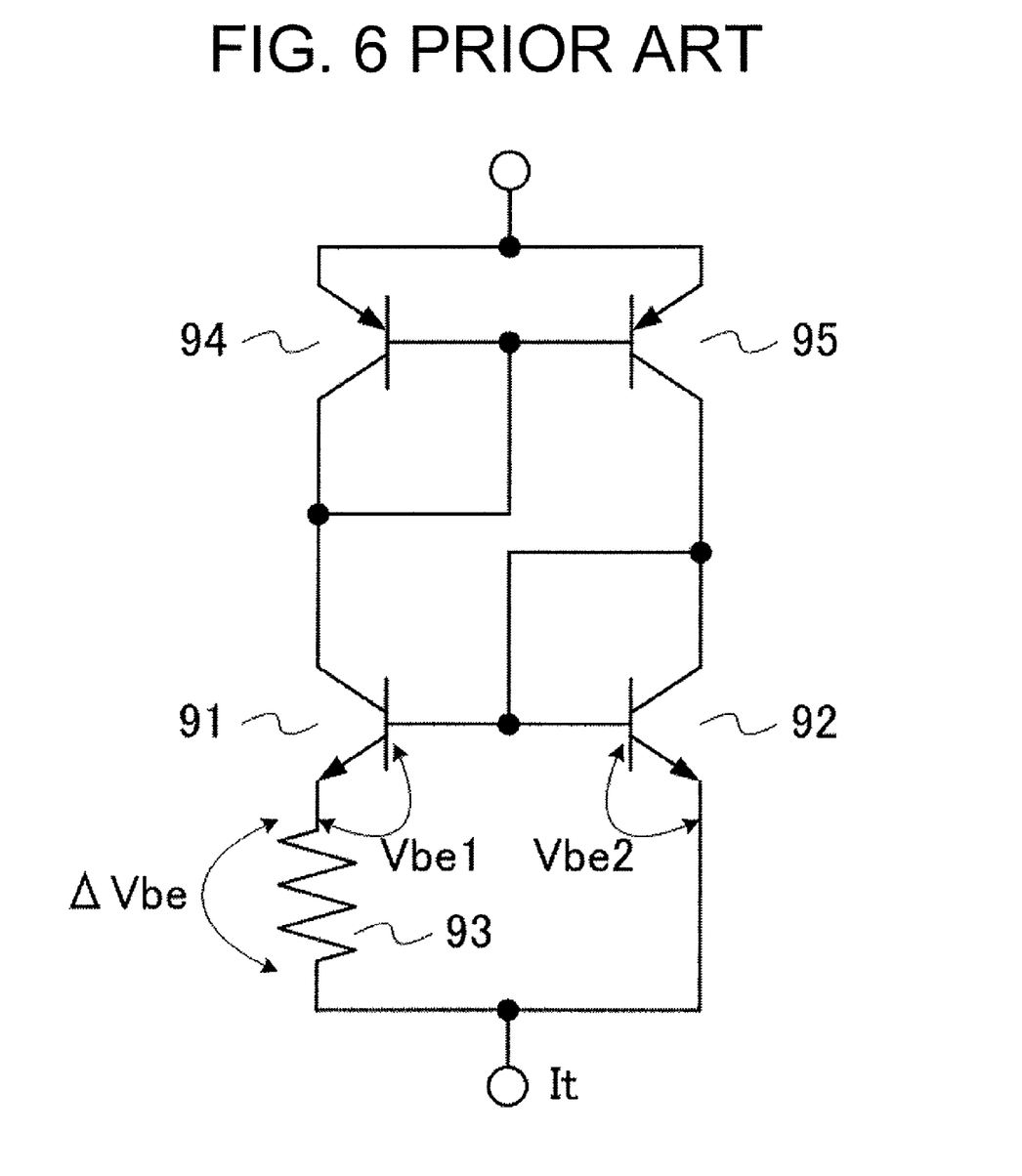
FIG. 6 is a circuit diagram illustrating a conventional two-terminal semiconductor temperature sensor device.

A conventional two-terminal semiconductor sensor device is described taking a temperature sensor as an example. FIG. 6 is a circuit diagram illustrating a conventional two-terminal semiconductor temperature sensor device.

An NPN bipolar transistor 91 generates a voltage Vbe1 between a base and an emitter thereof based on temperature. An NPN bipolar transistor 92 also generates a voltage Vbe2 between a base and an emitter thereof based on temperature at the time. Then, a differential voltage ΔVbe between the voltage Vbe2 and the voltage Vbe1 is generated across a resistor 93. Based on the differential voltage ΔVbe and a resistance of the resistor 93, the resistor 93 causes a current based on the temperature at the time to flow therethrough. The current is allowed to flow through a PNP bipolar transistor 94, the NPN bipolar transistor 91, and the resistor 93. The current is also allowed to flow through a PNP bipolar transistor 95 and the NPN bipolar transistor 92 because the PNP bipolar transistor 94 and the PNP bipolar transistor 95 form a current mirror circuit. Accordingly, based on the temperature at the time, the two-terminal semiconductor sensor device outputs the current flowing through the PNP bipolar transistor 94 and the PNP bipolar transistor 95 as an output current It (see, for example, JP 63-041013 B, FIG. 1).

The external device converts the output current It into a voltage by causing the output current It to flow through a resistor or the like, and the voltage is provided as a measurement value of the sensor.

However, when the resistor or the like for receiving the output current It has low accuracy on the side of the external device that receives the output current It, the output current It may not be accurately converted to the voltage in the external device.

SUMMARY OF THE INVENTION

The present invention has been made in view of the above-mentioned problem, and therefore has an object to provide a two-terminal semiconductor sensor device that does not depend on the accuracy of a circuit or element of an external device.

In order to solve the above-mentioned problem, the present invention provides a two-terminal semiconductor sensor device to be connected to an external device through two terminals, including:

a first external terminal to be connected to a ground potential that is common to the external device;

a second external terminal for receiving an operating current from the external device;

a sensor circuit for measuring one physical amount to output a voltage based on the one physical amount;

a voltage dividing circuit for dividing a voltage between the first external terminal and the second external terminal to output a divided voltage;

a differential amplifier circuit for receiving the voltage output from the sensor circuit and the divided voltage to output a voltage based on a difference therebetween; and an output transistor having a gate connected to an output terminal of the differential amplifier circuit, a drain connected to one of the first external terminal and the second external terminal, and a source connected to another one of the first external terminal and the second external terminal.

According to the present invention, by employing the structure as described above, an output voltage of the two-terminal semiconductor sensor device is defined by a resistance ratio of the voltage dividing circuit and the voltage based on the one physical amount. In other words, the present invention may provide the highly accurate two-terminal semiconductor sensor device that is not affected by the accuracy of the circuit or element of an input terminal of the external device.

DETAILED DESCRIPTION OF THE PREFERRED EMBODIMENTS

Figure 1:
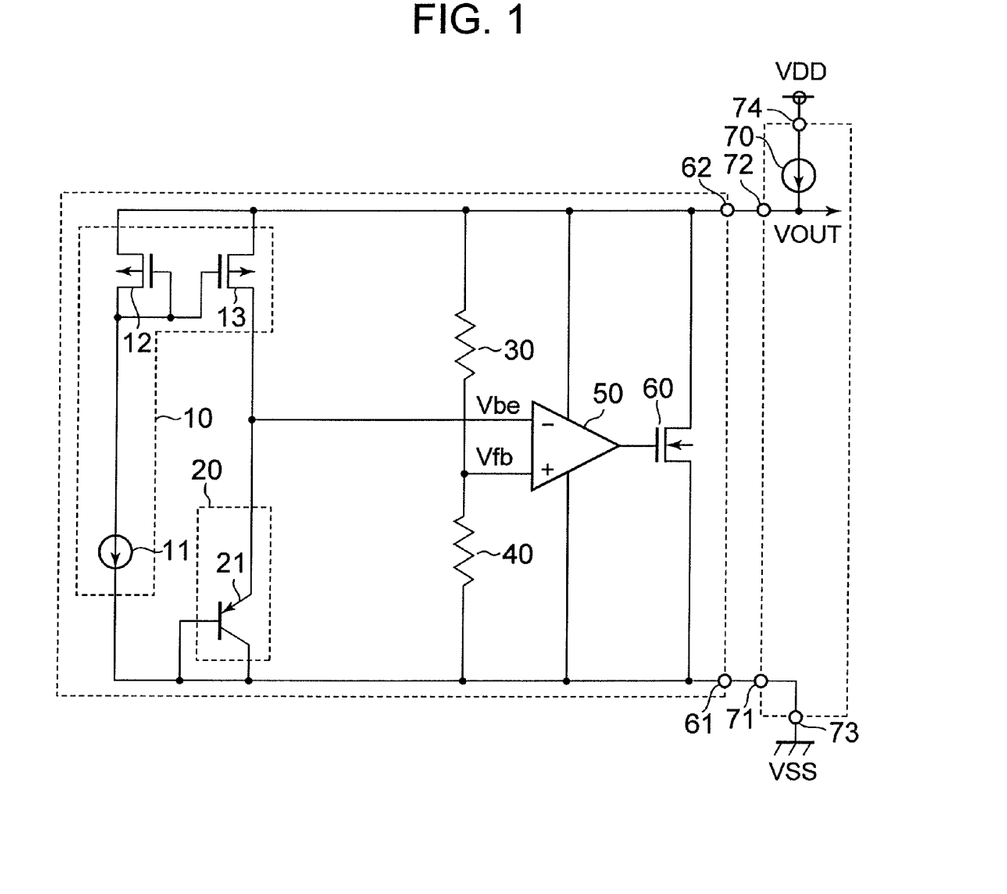
FIG. 1 is a circuit diagram illustrating a two-terminal semiconductor sensor device according to the present invention.

Hereinafter, two-terminal semiconductor sensor devices according to the present invention are described with reference to the drawings taking a semiconductor temperature sensor as an example. FIG. 1 is a circuit diagram illustrating a two-terminal semiconductor sensor device according to the present invention.

The two-terminal semiconductor sensor device includes a constant current circuit 10, a temperature detecting circuit 20, resistors 30 and 40, a differential amplifier circuit 50, and an output transistor 60. The two-terminal semiconductor sensor device also includes external terminals 61 and 62.

The constant current circuit 10 includes a constant current source 11 and PMOS transistors 12 and 13. The temperature detecting circuit 20 includes a PNP bipolar transistor 21.

The constant current circuit 10 is provided between the external terminal 62 and the external terminal 61, and has an output terminal connected to an inverting input terminal of the differential amplifier circuit 50. The temperature detecting circuit 20 is provided between the inverting input terminal of the differential amplifier circuit 50 and the external terminal 61. The resistor 30 has one end connected to the external terminal 62 and another end connected to a non-inverting input terminal of the differential amplifier circuit 50. The resistor 40 has one end connected to the non-inverting input terminal of the differential amplifier circuit 50 and another end connected to the external terminal 61. The differential amplifier circuit 50 is provided between the external terminal 62 and the external terminal 61. The output transistor 60 has a gate connected to an output terminal of the differential amplifier circuit 50, a source connected to the external terminal 61, and a drain connected to the external terminal 62. The external terminal 62 is connected to an external terminal 72. The external terminal 61 is connected to an external terminal 71.

The constant current source 11 is provided between a drain of the PMOS transistor 12 and the external terminal 61. The PMOS transistor 12 has a gate connected to the drain and a source connected to the external terminal 62. The PMOS transistor 13 has a gate connected to the drain of the PMOS transistor 12, a source connected to the external terminal 62, and a drain connected to the output terminal of the constant current circuit 10. The PNP bipolar transistor 21 has a base and a collector, which are connected to the external terminal 61, and an emitter connected to an output terminal of the temperature detecting circuit 20.

The external terminal 62 outputs an output voltage VOUT. The external terminal 61 receives a ground voltage VSS. The constant current circuit 10 supplies a constant current. Specifically, the current mirror circuit including the PMOS transistors 12 and 13 supplies the constant current based on a current of the constant current source 11. The temperature detecting circuit 20 outputs a temperature voltage Vbe based on the constant current and temperature. Specifically, the PNP bipolar transistor 21 of the temperature detecting circuit 20 has a negative temperature coefficient so that an emitter voltage becomes lower as the temperature becomes higher, and the emitter voltage becomes higher as the temperature becomes lower. A voltage dividing circuit including the resistor 30 and the resistor 40 receives the output voltage VOUT, divides the output voltage VOUT, and outputs a divided voltage Vfb. The differential amplifier circuit 50 compares the temperature voltage Vbe and the divided voltage Vfb, and controls the output transistor 60 so that the temperature voltage Vbe and the divided voltage Vfb become equal to each other. The output transistor 60 outputs the output voltage VOUT. The output transistor 60 is an NMOS transistor.

A driving ability ratio of the PMOS transistor 12 and the PMOS transistor 13 is 1:1. A resistance ratio of the voltage dividing circuit including the resistor 30 and the resistor 40 is N b 1.

The two-terminal semiconductor sensor device according to the present invention has the structure as described above, and the external device to be connected to the external terminals has the following structure.

The two-terminal semiconductor sensor device and the external device are connected through the external terminals 61 and 71 and the external terminals 62 and 72. The external terminal 72 of the external device is connected to a power supply VDD through a constant current source 70, and the external terminal 71 is connected to the ground voltage VSS.

The external terminal 72 of the external device supplies an operating current to the two-terminal semiconductor sensor device and receives the output voltage VOUT of the two-terminal semiconductor sensor device. Therefore, the constant current source 70 needs to supply a current that is equal to or larger than the maximum operating current of the two-terminal semiconductor sensor device.

Next, operation of the two-terminal semiconductor sensor device is described.

As the temperature becomes higher, the temperature voltage Vbe becomes lower. As the temperature voltage Vbe becomes lower than the divided voltage Vfb, an output voltage of the differential amplifier circuit 50 becomes higher. Therefore, the output transistor 60 is turned on, and the output voltage VOUT becomes lower. This decrease in output voltage VOUT conforms with the decrease in temperature voltage Vbe. In other words, the output voltage of the differential amplifier circuit 50 is fed back to the temperature voltage Vbe through the output voltage VOUT. Note that the output voltage VOUT is divided into the divided voltage Vfb by the resistor 30 and the resistor 40, and the non-inverting input terminal and the inverting input terminal of the differential amplifier circuit 50 are imaginarily short-circuited so that the divided voltage Vfb is substantially equal to the temperature voltage Vbe. Accordingly, the output voltage VOUT is calculated as:

$$VOUT = N \times Vbe.$$

This equation indicates that the output voltage VOUT based on the temperature is based not on the constant current of the constant current source 70 of the external device and a current of the output transistor 60 of the two-terminal semiconductor sensor device, but on the resistance ratio of the voltage dividing circuit including the resistor 30 and the resistor 40, and the temperature voltage Vbe of the two-terminal semiconductor sensor device. The output voltage VOUT based on the temperature is used in the external device.

As the temperature becomes lower, the temperature voltage Vbe becomes higher. As the temperature voltage Vbe becomes higher than the divided voltage Vfb, the output voltage of the differential amplifier circuit 50 becomes lower. Therefore, the output transistor 60 is turned off, and the output voltage VOUT becomes higher.

With this structure, the output voltage VOUT of the two-terminal semiconductor sensor device based on the temperature is based not on the constant current of the constant current source 70 of the external device and the current of the output transistor 60 of the two-terminal semiconductor sensor device, but on the resistance ratio of the voltage dividing circuit including the resistor 30 and the resistor 40, and the temperature voltage Vbe of the two-terminal semiconductor sensor device. Accordingly, the accuracy of the constant current of the constant current source 70 of the external device that receives the output voltage VOUT does not need to be high. Therefore, there may be provided a highly accurate two-terminal semiconductor sensor device that is not affected by the accuracy of the circuit or element of the external device.

Figure 2:
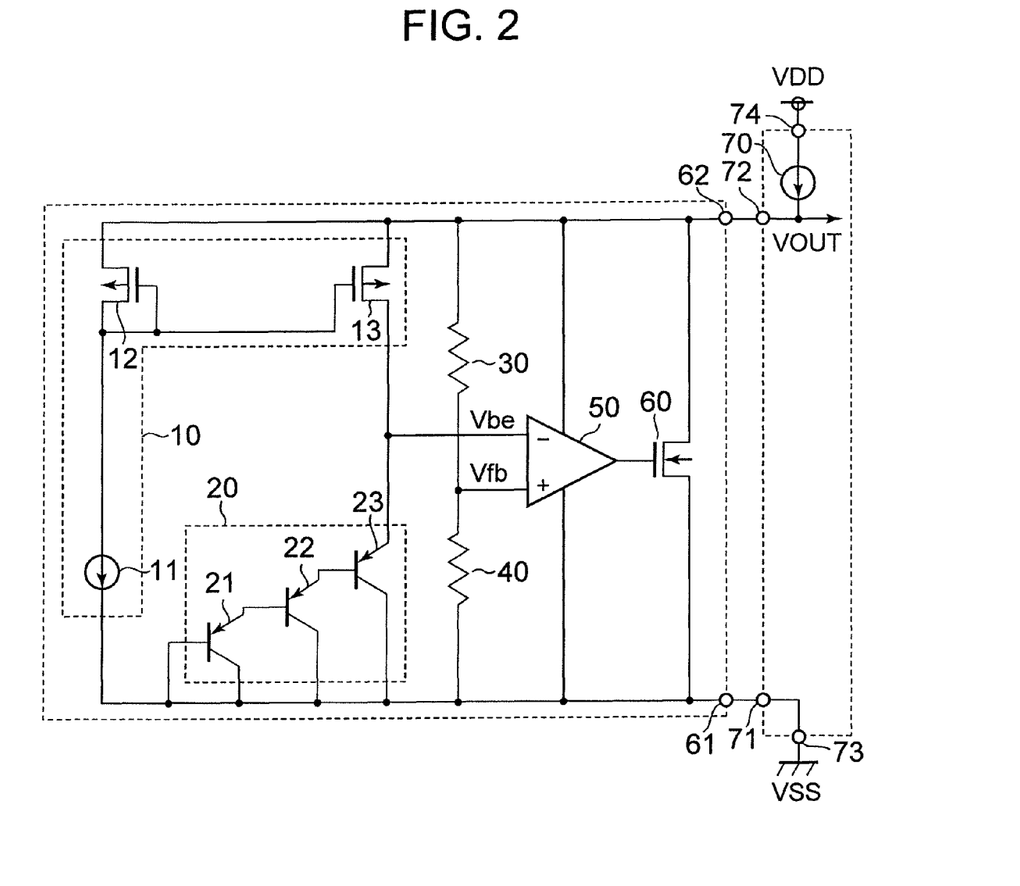
FIG. 2 is a circuit diagram illustrating another two-terminal semiconductor sensor device including a temperature sensor circuit.

Note that, in FIG. 1, the temperature detecting circuit 20 includes the PNP bipolar transistor 21 having the base and the collector, which are connected to the external terminal 61, and the emitter connected to the output terminal of the temperature detecting circuit 20. However, as illustrated in FIG. 2, the temperature detecting circuit 20 may include: the PNP bipolar transistor 21 having the base and the collector, which are connected to the external terminal 61; a PNP bipolar transistor 22 having a base connected to the emitter of the PNP bipolar transistor 21, and a collector connected to the external terminal 61; and a PNP bipolar transistor 23 having a base connected to an emitter of the PNP bipolar transistor 22, an emitter connected to the output terminal of the temperature detecting circuit 20, and a collector connected to the external terminal 61. With this structure having three PNP bipolar transistors instead of one PNP bipolar transistor, the temperature voltage Vbe becomes higher accordingly, and the output voltage VOUT also becomes higher.

Figure 3:
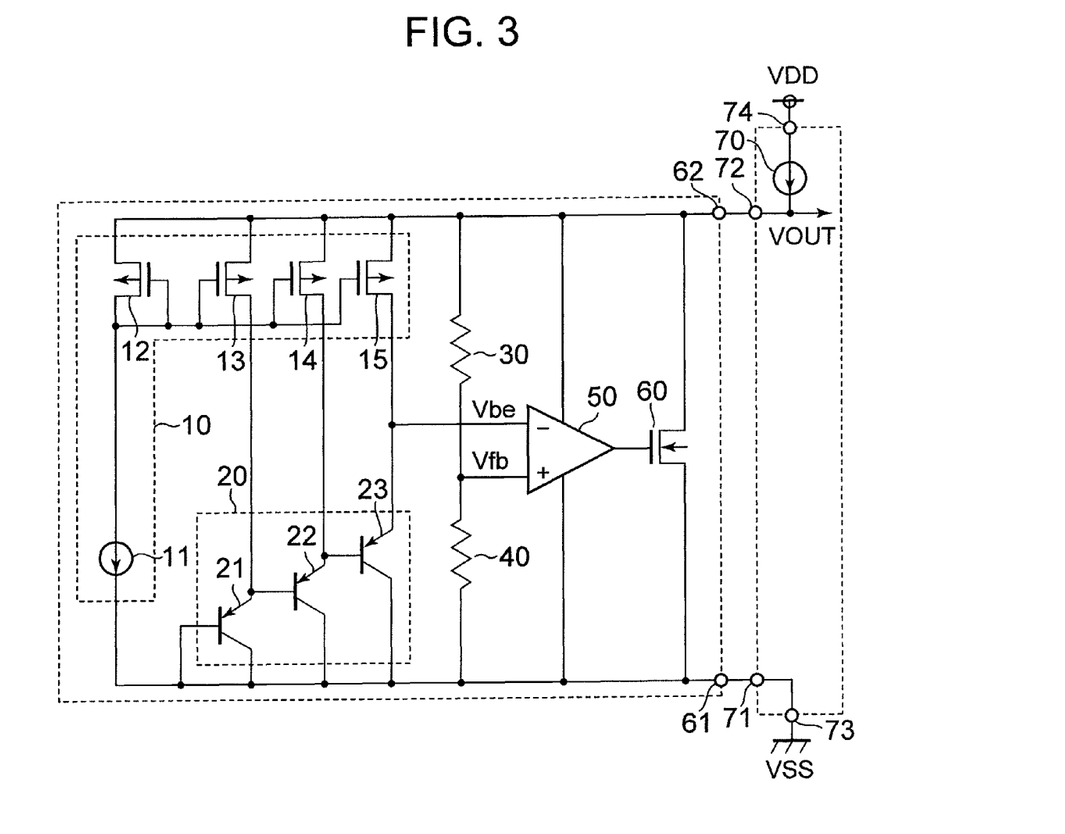
FIG. 3 is a circuit diagram illustrating still another two-terminal semiconductor sensor device including a temperature sensor circuit.

Further, in FIG. 2, the constant current is supplied only to the emitter of the PNP bipolar transistor 23. However, as illustrated in FIG. 3, the constant current may be supplied to each of the emitters of the PNP bipolar transistors 21 to 23. With this structure, currents flowing through the PNP bipolar transistors 21 to 23 may be adjusted to be, for example, equal to one another.

Further, in FIG. 1, the differential amplifier circuit 50 receives the temperature voltage Vbe at the inverting input terminal and the divided voltage Vfb at the non-inverting input terminal, and outputs the output voltage to the gate of the NMOS transistor. However, though not illustrated, the differential amplifier circuit 50 may receive the divided voltage Vfb at the inverting input terminal and the temperature voltage Vbe at the non-inverting input terminal, and output the output voltage to a gate of a PMOS transistor.

Figure 4:
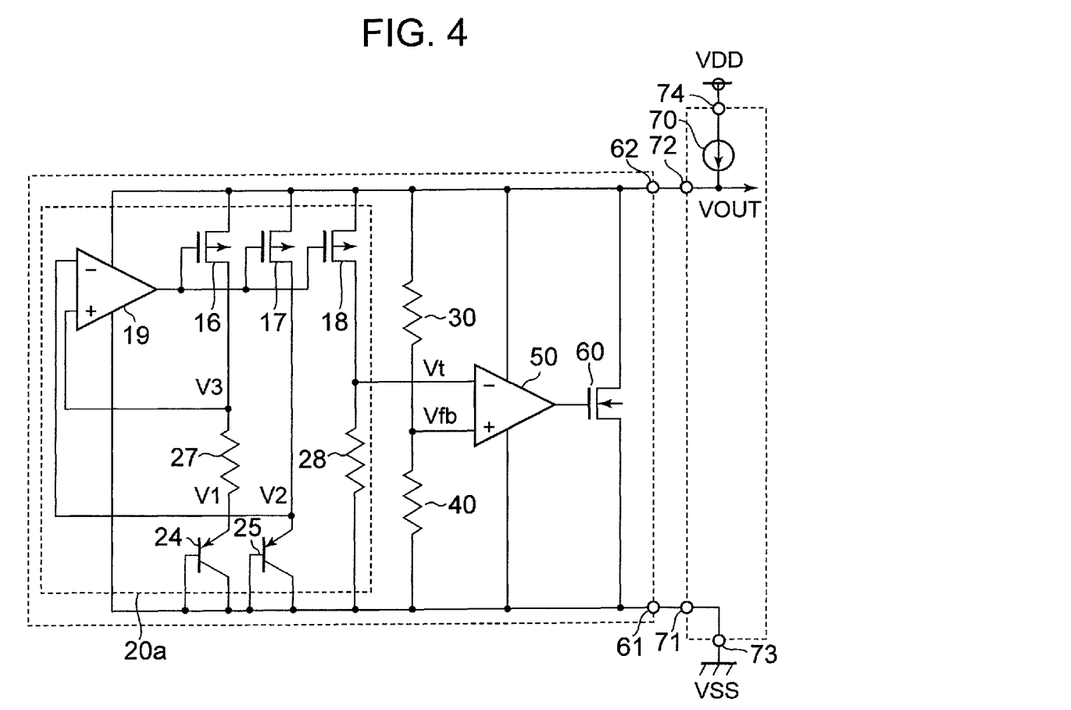
FIG. 4 is a circuit diagram illustrating yet another two-terminal semiconductor sensor device including a temperature sensor circuit.

FIG. 4 is a circuit diagram illustrating another two-terminal semiconductor sensor device including a temperature sensor circuit.

The two-terminal semiconductor sensor device of FIG. 4 includes a temperature detecting circuit 20a, resistors 30 and 40, a differential amplifier circuit 50, and an output transistor 60. The temperature detecting circuit 20a includes PMOS transistors 16 to 18, PNP bipolar transistors 24 and 25, resistors 27 and 28, and a differential amplifier circuit 19.

The temperature detecting circuit 20a is provided between an external terminal 62 and an external terminal 61, and has an output terminal connected to an inverting input terminal of the differential amplifier circuit 50. The differential amplifier circuit 19 is provided between the external terminal 62 and the external terminal 61, and has a non-inverting input terminal connected to a node between a drain of the PMOS transistor 16 and an end of the resistor 27, an inverting input terminal connected to a node between a drain of the PMOS transistor 17 and an emitter of the PNP bipolar transistor 25, and an output terminal connected to gates of the PMOS transistors 16 to 18. Sources of the PMOS transistors 16 and 17 are connected to the external terminal 62. The PMOS transistor 18 has a source connected to the external terminal 62 and a drain connected to the output terminal of the temperature detecting circuit 20a. The resistor 27 is provided between the drain of the PMOS transistor 16 and an emitter of the PNP bipolar transistor 24. The resistor 28 is provided between the output terminal of the temperature detecting circuit 20a and the external terminal 61. Bases and collectors of the PNP bipolar transistors 24 and 25 are connected to the external terminal 61.

The temperature detecting circuit 20a outputs a temperature voltage Vt based on temperature. Specifically, the PNP bipolar transistors 24 and 25 of the temperature detecting circuit 20a each have a negative temperature coefficient so that an emitter voltage becomes lower as the temperature becomes higher, and the emitter voltage becomes higher as the temperature becomes lower.

The resistor 27 generates a differential voltage ΔVbe between the emitter voltages of the PNP bipolar transistor 24 and the PNP bipolar transistor 25. The resistor 28 generates the temperature voltage Vt based on the differential voltage ΔVbe. A current mirror circuit including the PMOS transistors 16 to 18 outputs a current to the resistor 27 and the PNP bipolar transistor 24 from a first output terminal, the current to the PNP bipolar transistor 25 from a second output terminal, and the current to the resistor 28 from a third output terminal, based on a voltage at an input terminal (output voltage of differential amplifier circuit 19). The differential amplifier circuit 19 controls the voltage at the input terminal of the current mirror circuit so that a voltage at the first output terminal and a voltage at the second output terminal of the current mirror circuit (voltage V3 at one end of resistor 27 and emitter voltage V2) become equal to each other.

A driving ability ratio of the PMOS transistor 16 and the PMOS transistor 17 is 1:1. An emitter area ratio of the PNP bipolar transistor 24 and the PNP bipolar transistor 25 is M:1 (M>1). Accordingly, the temperature coefficient of the PNP bipolar transistor 24 is larger than the temperature coefficient of the PNP bipolar transistor 25. The resistors 27 and 28 are formed of the same type of material and arranged proximately in a mask layout to have substantially the same production fluctuation and temperature characteristic.

Figure 5:
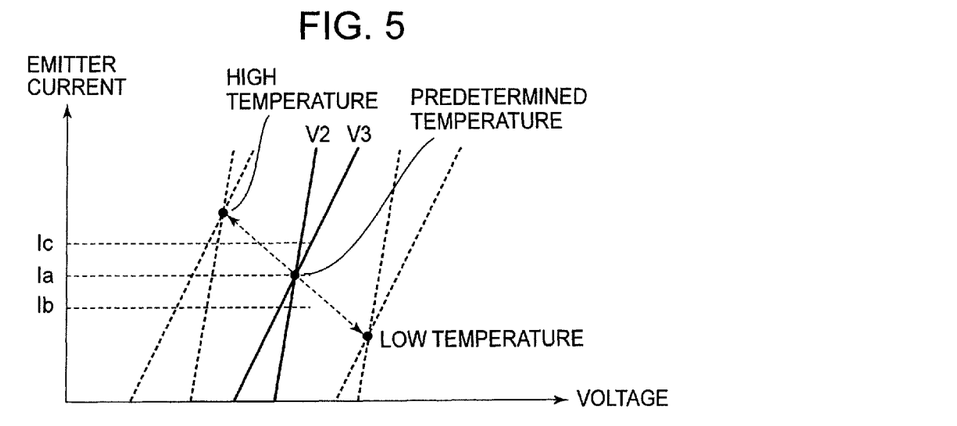
FIG. 5 is a graph illustrating emitter voltages and emitter currents based on temperature.

Next, operation of the two-terminal semiconductor sensor device of FIG. 4 is described. FIG. 5 is a graph illustrating emitter voltages and emitter currents based on the temperature.

As the temperature becomes higher, emitter voltages V1 and V2 of the PNP bipolar transistors 24 and 25 become lower, and due to the emitter area ratio, the emitter voltage V1 is even lower than the emitter voltage V2. Then, with the voltage V3 at the one end of the resistor 27 and the emitter voltage V2 being equal by the operation of the differential amplifier circuit 19 as described below, the differential voltage (V3−V1=V2−V1=ΔVbe) generated in the resistor 27 becomes higher, and the current flowing through the resistor 27 becomes larger. With the differential voltage ΔVbe becoming higher as the temperature becomes higher, the differential voltage ΔVbe has a positive temperature coefficient. With the current flowing through the resistor 27 becoming larger as the temperature becomes higher, the current also has a positive temperature coefficient. The current is allowed to flow through the resistor 28 because of the current mirror connection of the PMOS transistors 16 to 18. Note that with the resistors 27 and 28 having substantially the same production fluctuation and temperature characteristic, the current flowing through the resistor 28 is hardly affected by the production fluctuation and temperature characteristic of the resistors 27 and 28. Therefore, the temperature voltage Vt based on the differential voltage ΔVbe is generated in the resistor 28. The temperature voltage Vt has a positive temperature coefficient, and as the temperature becomes higher, the temperature voltage Vt also becomes higher. As the temperature voltage Vt becomes higher than the divided voltage Vfb, the output voltage of the differential amplifier circuit 50 becomes lower. Therefore, the output transistor 60 is turned off, and the output voltage VOUT becomes higher. This increase in output voltage VOUT conforms with the increase in temperature voltage Vt. In other words, the output voltage of the differential amplifier circuit 50 is fed back to the temperature voltage Vt through the output voltage VOUT. Note that the output voltage VOUT is divided into the divided voltage Vfb by the resistor 30 and the resistor 40, and the non-inverting input terminal and the inverting input terminal of the differential amplifier circuit 50 are imaginarily short-circuited so that the divided voltage Vfb is substantially equal to the temperature voltage Vt. Accordingly, the output voltage VOUT is calculated as:

$$VOUT = N \times Vt.$$

In FIG. 5, a slope of the emitter current of the PNP bipolar transistor 24 with respect to the voltage V3 is smaller than a slope of the emitter current of the PNP bipolar transistor 25 with respect to the emitter voltage V2 because of the resistor 27. As the temperature becomes higher, the emitter currents of the PNP bipolar transistors 24 and 25 increase in accordance with the emitter area ratio, and the slopes of the emitter currents become steeper. Further, as the temperature becomes higher, it becomes easier for the emitter currents to flow in accordance with the emitter area ratio. Therefore, even when the voltage V3 and the emitter voltage V2 are low, the emitter currents begin to flow.

At a predetermined temperature in FIG. 5, if the emitter currents of the PNP bipolar transistors 24 and 25 become a current Ib that is smaller than a current Ia, and if the emitter voltage V2 becomes higher than the voltage V3, the output voltage of the differential amplifier circuit 19 becomes low, drain currents of the PMOS transistors 16 and 17 increase, and the emitter currents of the PNP bipolar transistors 24 and 25 also increase to approach the current Ia. On the other hand, if the emitter currents of the PNP bipolar transistors 24 and 25 become a current Ic that is larger than the current Ia, the emitter currents of the PNP bipolar transistors 24 and 25 decrease to approach the current Ia. In other words, the emitter currents of the PNP bipolar transistors 24 and 25 are maintained at the current Ia that is obtained when the emitter voltage V2 and the voltage V3 are equal to each other. That is, the emitter voltage V2 and the voltage V3 become equal to each other.

As the temperature becomes higher than the predetermined temperature, even when the emitter voltage V2 and the voltage V3 are low, the emitter currents of the PNP bipolar transistors 24 and 25 increase as illustrated in FIG. 5. In other words, as the differential voltage ΔVbe becomes higher, the emitter voltage V2 and the voltage V3 become lower, and the emitter currents of the PNP bipolar transistors 24 and 25 increase. On the other hand, as the temperature becomes lower than the predetermined temperature, even when the emitter voltage V2 and the voltage V3 are high, the emitter currents of the PNP bipolar transistors 24 and 25 decrease. In other words, as the differential voltage ΔVbe becomes lower, the emitter voltage V2 and the voltage V3 become higher, and the emitter currents of the PNP bipolar transistors 24 and 25 decrease.

As the temperature becomes lower, the temperature voltage Vt becomes lower. As the temperature voltage Vt becomes lower than the divided voltage Vfb, the output voltage of the differential amplifier circuit 50 becomes higher. Therefore, the output transistor 60 is turned on, and the output voltage VOUT becomes lower.

What is claimed is:

1. A two-terminal semiconductor sensor device to be connected to an external device through two terminals, comprising:
   a first external terminal to be connected to a ground potential that is common to the external device;
   a second external terminal for receiving an operating current from the external device;
   a sensor circuit for measuring one physical amount to output a voltage based on the one physical amount, wherein the one physical amount comprises temperature, and wherein the sensor circuit comprises:
      a constant current circuit for supplying a constant current; and
      a temperature detecting circuit for receiving the constant current to output a voltage based on the temperature, wherein the temperature detecting circuit comprises:
         a bipolar transistor having a base and a collector, which are connected to the first external terminal and an emitter connected to an output terminal of the sensor circuit;
   a voltage dividing circuit for dividing a voltage between the first external terminal and the second external terminal to output a divided voltage;
   a differential amplifier circuit for receiving the voltage output from the sensor circuit and the divided voltage to output a voltage based on a difference therebetween; and
   an output transistor having a gate connected to an output terminal of the differential amplifier circuit, a drain connected to one of the first external terminal and the second external terminal, and a source connected to another one of the first external terminal and the second external terminal.

2. A two-terminal semiconductor sensor device to be connected to an external device through two terminals, comprising:
   a first external terminal to be connected to a ground potential that is common to the external device;
   a second external terminal for receiving an operating current from the external device;
   a sensor circuit for measuring one physical amount to output a voltage based on the one physical amount, wherein the one physical amount comprises temperature and wherein the sensor circuit comprises:
      a constant current circuit for supplying a constant current; and
      a temperature detecting circuit for receiving the constant current to output a voltage based on the temperature, wherein the temperature detecting circuit comprises:
         a first bipolar transistor having a base and a collector, which are connected to the first external terminal;
         a second bipolar transistor having a base connected to an emitter of the first bipolar transistor, and a collector connected to the first external terminal; and
         a third bipolar transistor having a base connected to an emitter of the second bipolar transistor, an emitter connected to an output terminal of the temperature detecting circuit, and a collector connected to the first external terminal;
   a voltage dividing circuit for dividing a voltage between the first external terminal and the second external terminal to output a divided voltage;
   a differential amplifier circuit for receiving the voltage output from the sensor circuit and the divided voltage to output a voltage based on a difference therebetween; and
   an output transistor having a gate connected to an output terminal of the differential amplifier circuit, a drain connected to one of the first external terminal and the second external terminal, and a source connected to another one of the first external terminal and the second external terminal.

3. A two-terminal semiconductor sensor device to be connected to an external device through two terminals, comprising:
   a first external terminal to be connected to a ground potential that is common to the external device;
   a second external terminal for receiving an operating current from the external device;
   a sensor circuit for measuring one physical amount to output a voltage based on the one physical amount, wherein the one physical amount comprises temperature;
   a voltage dividing circuit for dividing a voltage between the first external terminal and the second external terminal to output a divided voltage;
   a differential amplifier circuit for receiving the voltage output from the sensor circuit and the divided voltage to output a voltage based on a difference therebetween;

an output transistor having a gate connected to an output terminal of the differential amplifier circuit, a drain connected to one of the first external terminal and the second external terminal, and a source connected to another one of the first external terminal and the second external terminal;

a first bipolar transistor having a base and a collector, which are connected to the first external terminal;

a second bipolar transistor having a base and a collector, which are connected to the first external terminal;

a first resistor having one terminal connected to an emitter of the first bipolar transistor;

a differential amplifier circuit having an input terminal connected to another terminal of the first resistor, and another input terminal connected to an emitter of the second bipolar transistor;

a current mirror circuit for outputting a current based on a voltage at an output terminal of the differential amplifier circuit from a plurality of output terminals, of which a first output terminal outputs the current to the first resistor and the first bipolar transistor, a second output terminal outputs the current to the second bipolar transistor, and a third output terminal outputs the current to the second resistor; and a second resistor having one terminal connected to the first external terminal, and another terminal serving as an output terminal of the sensor circuit.

4. A two-terminal semiconductor sensor device according to claim 3, wherein the sensor circuit comprises:

a constant current circuit for supplying a constant current; and a temperature detecting circuit for receiving the constant current to output a voltage based on the temperature.

* * * * *